US006805369B2

(12) United States Patent
Galazin

(10) Patent No.: US 6,805,369 B2
(45) Date of Patent: Oct. 19, 2004

(54) SPRING BEAM SUSPENSION WITH COMPRESSED AXLE MOUNTING

(75) Inventor: Gregory T. Galazin, Muskegon, MI (US)

(73) Assignee: The Holland Group, Inc., Holland, MI (US)

( * ) Notice: Subject to any disclaimer, the term of this patent is extended or adjusted under 35 U.S.C. 154(b) by 154 days.

(21) Appl. No.: 09/936,678
(22) PCT Filed: Jan. 18, 2001
(86) PCT No.: PCT/US01/01689
§ 371 (c)(1),
(2), (4) Date: Sep. 14, 2001
(87) PCT Pub. No.: WO01/53779
PCT Pub. Date: Jul. 26, 2001

(65) Prior Publication Data
US 2003/0067134 A1 Apr. 10, 2003

Related U.S. Application Data
(60) Provisional application No. 60/177,023, filed on Jan. 19, 2000.

(51) Int. Cl.[7] .................................................. B60G 9/02
(52) U.S. Cl. ......................... 280/124.116; 280/124.162; 280/124.17
(58) Field of Search ...................... 280/124.116, 124.11, 280/124.128, 124.162, 124.17, FOR 145, FOR 169, FOR 175, FOR 177

(56) References Cited
U.S. PATENT DOCUMENTS 3,251,608 A    5/1966   Reidel
4,639,595 A    1/1987   Okita et al.
5,366,237 A    11/1994  Dilling et al.

FOREIGN PATENT DOCUMENTS

| DE | 41 10 593 | | 10/1992 | |
|----|-----------|---|---------|---|
| DE | 42 24 965 | | 8/1993 | |
| DE | 296 15 286 | | 10/1996 | |
| EP | 0162 189 A1 | | 11/1985 | |
| EP | 0 873 892 A2 | | 10/1998 | |
| FR | 2 711 337 | | 4/1995 | |
| GB | 184139 | | 9/1921 | |
| GB | 1203386 | * | 6/1970 | ........ 280/FOR 177 |
| JP | 5-22421 | | 2/1993 | |
| WO | WO9706022 | | 2/1997 | |

* cited by examiner

Primary Examiner—Eric Culbreth
(74) Attorney, Agent, or Firm—Price, Heneveld, Cooper, DeWitt & Litton, LLP.

(57) ABSTRACT

A suspension (10) adapted to mount on a vehicle frame having a pair of spaced frame rails (14). The suspension (10) comprises a pair of trailing arm assemblies (12) that carry an axle (16). Each trailing arm assembly comprises a frame bracket (24) adapted to be mounted to one of the frame rails (14) and a spring beam (20) pivotally mounted at one end to the frame bracket (24) for pivotal movement about a pivot axis (23) and adapted to carry an axle (16) at another end. A spring (26) is disposed between the spring beam other end and the corresponding frame rail to resist the rotational movement of the trailing arm toward the frame. An axle seat (62) is integrally formed in the spring beam (20) for mounting the axle (16) thereto. The spring beam (20) has a pivot axis center line and the axle seat has a center line, which is located outboard of the pivot axis center line.

31 Claims, 9 Drawing Sheets

SPRING BEAM SUSPENSION WITH COMPRESSED AXLE MOUNTING

CROSS REFERENCE TO RELATED APPLICATIONS

This application claims the benefit of International Patent Application No. PCT/US01/01689, filed Jan. 18, 2001, which claims the benefit of U.S. Provisional patent application No. 60/177,023, filed Jan. 19, 2000.

BACKGROUND OF THE INVENTION

1. Field of the Invention

The invention relates to a trailing arm suspension. In one of its aspects, the invention relates to a trailing arm suspension having a spring beam that mounts an axle without welding of the axle. In another of its aspects, the invention relates to a lower weight trailing arm suspension for use with trailer tandem axles. In another of its aspects, the invention relates to a trailing arm suspension with improved roll stability.

2. Description of the Related Art

Trailing arm suspensions are well known and commonly used in heavy-duty applications such as a tractor-trailer configuration. The trailing arm suspension typically comprises a pair of spaced trailing arm assemblies mounted to opposite sides of the vehicle, with each trailing arm assembly carrying an axle supporting the vehicle wheels.

The trailing arm assembly comprises a trailing arm having one portion pivotally mounted to a hanger bracket that depends from a vehicle frame rail. An air spring is disposed between another portion of the trailing arm and the vehicle frame rail to dampen the rotation of the trailing arm relative to the vehicle frame.

An important function of the trailing arm suspension is compliance in response to vehicle roll-induced forces. The vehicle roll-induced forces are typically created during the turning of the vehicle. As the vehicle is turned, the vehicle tends to rotate about its longitudinal axis in response to the G-forces encountered during the turn, causing one side of the vehicle to drop and another side of the vehicle to rise. This relative movement results in a corresponding relative rotational movement between the trailing arms on opposite sides of the vehicle. The suspension must be sufficiently compliant to permit some rolling of the vehicle in order to avoid undue torsional stress on the axles. However, the suspension must also be sufficiently stiff to resist vehicle roll beyond a predetermined roll angle for safety reasons. Generally, it is desirable to limit vehicle roll to a roll angle of about 2½ degrees for most trailing arm suspensions. The roll angle is the arc traversed by trailer about its longitudinal axis measured relative to a horizontal line passing through the center of gravity of the vehicle.

In rigid beam trailing arm suspensions, the roll stiffness of the suspension is achieved through the mechanical torquing of the axle as the rigid trailing arms move relative to each other to twist or torque the axle. If the mechanical torquing of the axle is too great, it can cause premature failure of the axle. The suspensions are made compliant to the roll with the use of a resilient connection between either or both the pivotal connection of the trailing arms to the hanger bracket and the connection of the axle to the trailing arm. The resilient connections are typically achieved by elastomeric bushings.

An ideal trailing arm suspension is substantially compliant up through about 2½ degrees of roll angle and then quickly becomes stiff to prevent the vehicle from rolling through too great of a roll angle. In other words, on a plot of roll moment versus roll angle, an ideal suspension will have a generally linear relationship between the roll moment and roll force until the compliance is exceeded then the curve will tend toward being infinite.

An alternative to the rigid beam trailing arm is a flexible beam also known as a spring beam. A spring beam typically is manufactured from spring steel that is capable of flexing in the vertical direction in response to vertical forces. One end of the spring beam is mounted to a hanger bracket by either a pinned connection or a resilient connection in the nature of an elastomeric bushing. The other end of the spring beam is rigidly mounted to the axle, usually through a bolted connection with an axle bracket that is welded to the axle, thus eliminating the need for a resilient connection between the axle and the beam. The spring beam advantageously functions much like a spring in that the response is relatively linear.

The welding of the axle to an axle bracket weakens the axle at the weld joint and ultimately results in failure of the axle. Typically, the axles must be made of sufficient thickness so that the torsional resistance of the axle at the welded joint is sufficient to meet torsional requirements for the suspension. On the other hand, non-welded axle connections can have thinner wall thickness and thus less weight and cost for the same suspension rating. Trailing arm suspensions with non-welded axle connections are disclosed in WO 97/06022, published 20 Feb. 1997.

SUMMARY OF THE INVENTION

The invention relates to an improved suspension including a pair of trailing arm assemblies adapted to mount on a vehicle frame having a pair of spaced frame rails. Each trailing arm assembly comprises a frame bracket adapted to be mounted to one of the frame rails, and a spring beam pivotally mounted at one end to the frame bracket for pivotal movement about a pivot axis and adapted to carry an axle in spaced relationship to the beam one end, for example, at another end of the beam. The suspension further includes a spring mounted to the trailing arm also in spaced relationship to the beam one end and adapted to mount to a corresponding frame rail to resist the rotational movement of the trailing arm toward the frame. According to the invention, an axle seat is integrally formed in the spring beam.

The axle seat preferably has a cylindrical-shape. The cylindrical-shape axle seat defines an axle opening that is sized for slidably receiving an axle. A portion of the spring beam can be bent, preferably about 360°, to form the cylindrical-shape that defines the axle opening.

The spring beam has a flange that extends laterally from the axle seat along a central portion of the spring beam for clamping the axle seat around the axle. The central portion of the spring beam and the flange in one embodiment have openings in registry with each other. A bolt extends through openings in the spring beam and the flange for clamping the cylindrical-shaped axle seat around the axle.

In an alternate embodiment, a fastener, such as a strap or a U-bolt, overlies a central portion of the spring beam and is clamped onto the flange. In this embodiment, the flange is formed from a separate block that is fixed, for example, by welding, to an end portion of the cylindrical-shape axle seat and is fixed to the fastener, by, for example, passing the U-bolt legs through openings in the block or welding the strap legs to the block.

In one embodiment of the invention, an axle is mounted in the axle seat in each of the trailing arm assemblies and a thin adhesive layer is disposed between the axle and the axle seat for bonding the axle to the axle seat. The axle seat is sized to substantially encircle the axle and is sprung in tension to compress the axle and evenly distribute a compressive load on the axle across at least two sets of diametrically opposed external surfaces of the axle. When an adhesive layer is provided between the axle and the axle seat, the compressive load of the axle seat on the axle in combination with the adhesive bond between the axle and the axle seat are sufficient to prevent relative movement of the axle with respect to the axle seat under ordinary service conditions.

In one embodiment, the axle seat is formed by bending another portion of the spring beam to define an axle opening that has a diameter less than a diameter of the axle when the axle seat is in an unsprung state. The other portion of the spring beam is thus in tension about the axle when the axle is mounted in the axle seat to thereby apply a compressive force to the axle.

In a preferred embodiment of the invention, the spring beam forms a traverse bolt opening for mounting the one end of the spring beam to the frame bracket for pivotal movement about a pivot axis. The spring beam has a longitudinal centerline perpendicular to the pivot axis and a longitudinal centerline transverse to the axle seat. The axle seat longitudinal centerline is located outboard of the pivot axis longitudinal centerline for greater roll stability of the vehicle. The traverse bolt opening is preferably cylindrically shaped.

In another preferred embodiment of the invention, a brake actuator is rigidly mounted to the spring beam closely adjacent the axle seat. Further, an S-cam bearing is rigidly mounted to the spring beam closely adjacent the axle seat.

Further according to the invention, a trailing arm suspension comprising a pair of trailing arm assemblies adapted to mount to a pair of spaced vehicle frame rails includes, in each trailing arm assembly, a frame bracket, a spring beam and a spring. The spring beam is pivotally mounted at one end to the frame bracket for pivotal movement about a pivot axis and has an axle seat in spaced relationship to the one end of the beam. The axle seat is adapted to carry an axle. The spring beam has a longitudinal center line perpendicular to the pivot axis and a longitudinal center line transverse to the axle seat. The spring is mounted to the spring beam in spaced relationship to the beam one end and is adapted to be mounted to one of the frame rails to resist the rotational movement of the trailing arm toward the frame. According to the invention, the axle seat longitudinal centerline is located outboard of the pivot axis longitudinal center line to increase the roll stability of the suspension.

DESCRIPTION OF THE PREFERRED EMBODIMENT

Figure 1:
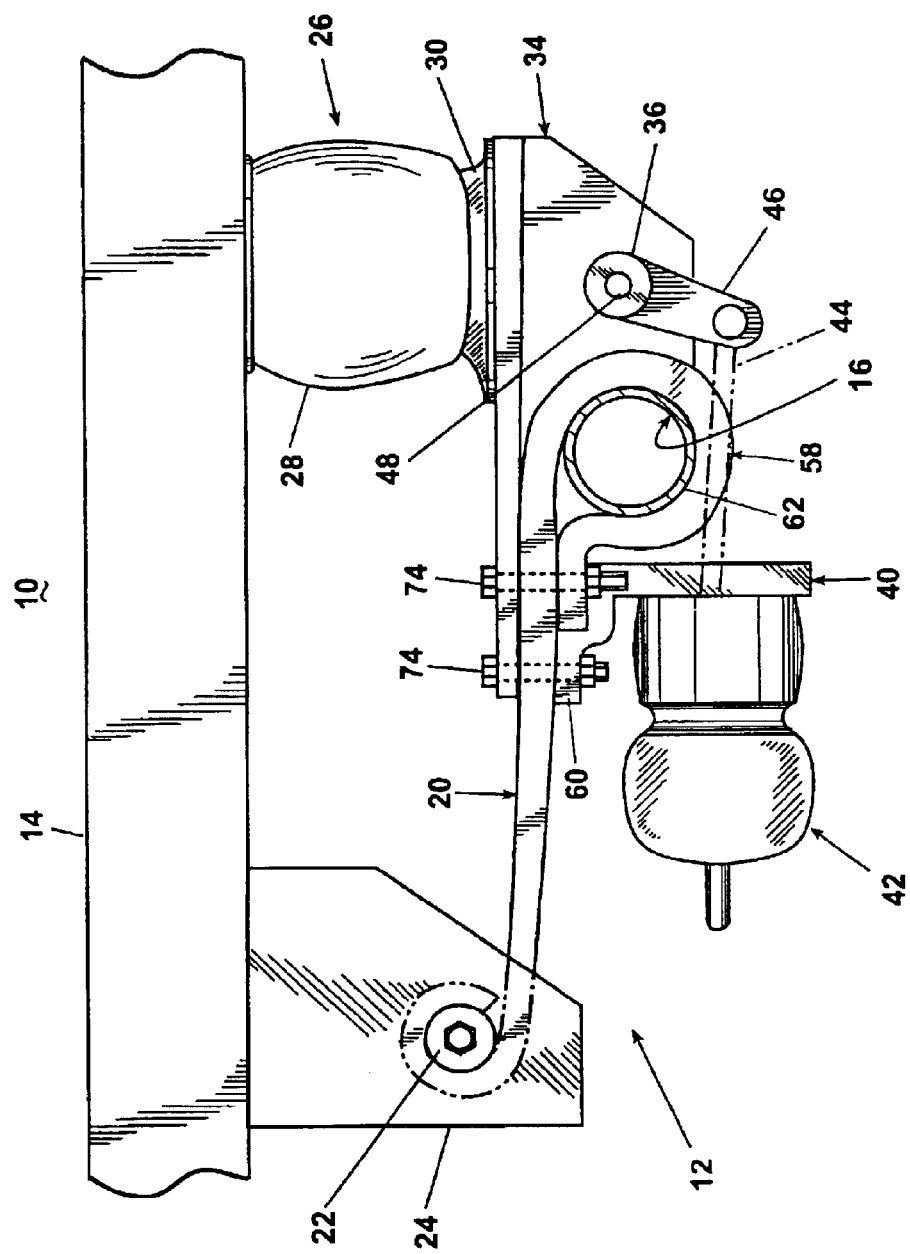
FIG. 1 is a side elevational view of a trailing arm assembly having a flexible beam with a compressible axle mount according to the invention.

FIG. 1 illustrates a trailing arm suspension 10 comprising a pair of trailing arm assemblies 12 mounted to a vehicle frame rail 14 on opposite sides of the vehicle and carrying between them an axle 16. Only one of the trailing arm assemblies 12 is shown since they are identical. It will be understood that the description of one of the trailing arm assemblies 12 applies to the other trailing arm assembly on the opposite side of the vehicle.

The trailing arm assembly 12 comprises a trailing arm in the form of a spring beam 20 having one portion pivotally mounted through a pivotal connector, such as bushed connector 22, to a frame bracket 24, which is mounted to the frame rail 14. An air spring 26 comprising a lift bag 28 and a support structure 30 extends between the frame rail 14 and the spring beam 20 to support the frame rail 14 on the rear portion of the spring beam and to yieldably resist the rotational movement of the spring beam 20 about the bushed connector 22 toward the frame rail 14. A mounting bracket 34 extends from the spring beam 20 and mounts the support structure 30 of the air spring 26 to couple the air spring 26 to the spring beam. A conventional air spring bracket can be used to mount the upper portion of the air spring to the frame 14. The mounting bracket 34 supports an S-cam bearing mount 36.

A brake mount 40 is rigidly mounted to the spring beam 20 and to the air spring mounting bracket 34 through bolts 74 and mounts an air-operated brake actuator 42 having a pushrod 44 that is connected to a slack adjuster 46. The slack adjuster 46 is mounted to a cam shaft 48, which is carried by an S-cam bearing (not shown) mounted to the S-cam bearing mount 36 of the mounting bracket 34.

Figure 2:
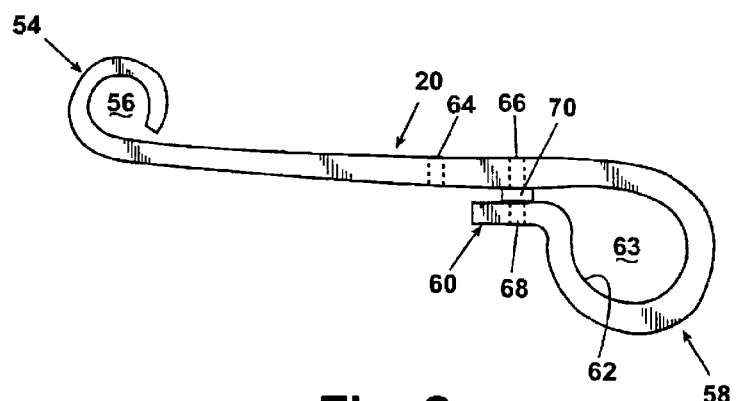
FIG. 2 is a side view of the flexible trailing arm of FIG. 1.
Figure 3:
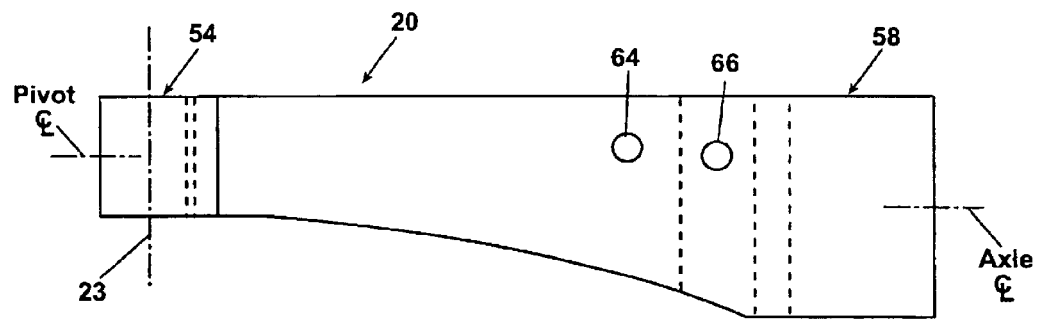
FIG. 3 is a top view of the flexible trailing arm of FIG. 2.

Referring to FIGS. 2 and 3, the spring beam 20 is significantly wider than it is thick like a leaf spring. The spring beam 20 comprises at one end thereof a cylindrical-shaped portion 54 that defines a bushing opening 56 through which bushed connector 22 is inserted to rotatably mount the spring beam to the frame bracket 24. The opening 54 is preferably sized such that it is slightly smaller than the periphery of the bushed connector to compressively hold the bushed connector therein. The bushed connector is well known in the art and includes a shaft surrounded by an annulus of elastomeric material. The shaft defines a pivot axis 23 of the spring beam.

The spring beam 20 further comprises at another end thereof another cylindrical-shaped end portion 58 that terminates in a clamping flange 60. The second cylindrical-shaped end portion 58 defines an axle seat 62 with an opening 63 that is sized slightly smaller than the diameter of axle 16 in its relaxed state. Typically, the clamping flange 60 is spaced from the central portion of the spring beam 20 through a spacer block 70 during the unassembled state so that the axle 16 can be slid into the axle seat 62 without frictional resistance from the axle seat.

Openings 64, 66, and 68 are formed in the spring beam 20 and the clamping flange 60, respectively. When the spacer block 70 is removed, the axle seat 62 resiliently shrinks onto the axle and the clamping flange 60 can be clamped to the central portion of the arm 20 to bring the axle seat into tight clamping relationship with the axle about the entire circumference of the axle 16. With this construction, the inner surface of the axle seat and is in tension to compress the axle and evenly distribute a compressive load on the axle across at least two sets of diametrically opposed external surfaces of the axle sufficient to prevent relative movement of the axle with respect to the axle seat under ordinary service conditions. Preferably, the compressive load is applied about the entire periphery of the axle.

As seen in FIG. 3, the center of the cylindrical-shaped portion 54, denoted by the pivot centerline, is inboard of the centerline of the cylindrical-shaped portion 58 as denoted by the axle centerline. Any force acting on or through the first rolled portion 54 and the second rolled portion 58 will effectively act along the pivot centerline and the axle centerline, respectively. Thus, the axle centerline is closer to a wheel mounted on the end of the axle than the pivot centerline, which reduces the moment arm between the wheel and the axle center line for any reaction force acting on the axle through the wheel. Since the trailing arms are arranged in pairs, the spacing of the axle centerlines of the trailing arms is greater than the spacing of the pivot centerlines or the trailing arms. The axle centerline is thus closer to the wheels from which the roll forces originate. The roll moments thus tend to be lower as a result of the wider spacing of the axle mounts to the trailing arm than if the axle centerlines were closer together.

For example, as the wheel encounters a bump in the road surface, the wheel will transfer a corresponding lifting force to the axle, which will apply a moment to the axle about the axle center line having a magnitude equal to the product of the lifting force and the moment arm. Since the wheels are effectively held in contact with the ground under normal circumstances, the bump-induced moment tends to bend the axle in a vertical plane, placing the top of the axle in compression and the bottom of the axle in tension. The compressive and tensile forces can cause the axle to fatigue or fail if they are too great The out board positioning of the axle centerline reduces the compressive and tensile forces by reducing the magnitude of the bump-induced moment by reducing the moment arm.

A similar advantage is obtained with regard to vehicle roll-induced moments acting on the axle. A roll-induced moment is ultimately results in a reaction force from the wheels contacting the ground. The roll-induced moment is effectively centered relative to the axle-midpoint since the trailing arm assemblies and wheels are symmetrically spaced relative to the vehicle. The roll-reaction moment arm is the distance from the axle midpoint to the axle centerline. As the axle centerline is moved outboard, the roll-reaction moment arm increases, which decreases the reaction force needed to counter the vehicle roll-induced moment. The lower the reaction force from the wheels, the less will be the stress placed on the axle as described above in the first example.

The spring beam is preferably hot forged from a spring steel billet in a conventional fashion for making a spring beam to make a straight elongated beam of spring steel. The cylindrical-shaped end portions 54 and 58 are formed when the spring beam is heated to an elevated temperature. In this condition, the metal is sufficiently pliable to shape the rolled portions of the spring beam. The cylindrical-shaped portion 54 is formed by merely rolling the end of the spring beam over a mandrel to form the desired size opening. Similarly, the cylindrical-shaped portion 58 is formed by bending the other end of the beam 90 degrees to the longitudinal axis of the beam to form the flange 60 and then rolling the adjacent portion of the opposite portion of the spring beam over a mandrel to form the desired size axle seat 62. The attaching flange 60 is spread from the central portion of the beam and the spacer block 70 is inserted between the mounting flange 60 and the spring beam 20 to open up the axle seat so that the axle can be easily slid into the opening without any significant frictional resistance from the axle seat 62.

Figure 4:
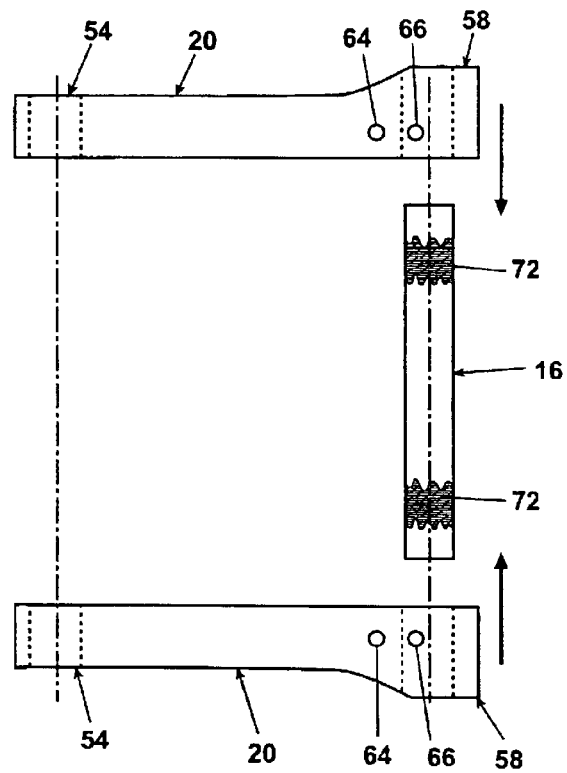
FIG. 4 is an exploded view of a portion of the flexible trailing arm and axle illustrated in FIG. 1.

Referring to FIG. 4, to assemble the trailing arm suspension 10, the spring beams 20 are positioned on opposite sides of the axle 16 so that the axle is aligned with the axle seat 62. A coating of adhesive 72, such as Metal-to-Metal adhesive sold by Loctite Corp., is placed about the exterior surface of the axle at the final locations of the axle seat 62. The axle is aligned with the axle seat 62. The spring beams 20 are then slid onto the ends of the axle 16 until they are in the desired position. The adhesive secures the axle 16 to the spring beam, assisted by the compression of the second rolled portion 58.

When the axle is properly positioned within the axle seat of the spring beams 20, the spacer block 70 is removed. The mounting bracket 34 and brake bracket 40 are then positioned on the spring beams 20 and mounting bolts 72, 74 are inserted through aligned openings on the mounting bracket 34, brake mount 40, and spring beam 20. Nuts are then threaded onto the bolts to secure the mounting bracket 34 and brake mount 40 to the spring beam 20. As the nut for the mounting bolt 74 is tightened. The mounting flange 60 is drawn tightly against the spring beam 20 to compress the axle within the axle seat 62 about essentially the entire circumference of the axle.

After the spring beams 20 are secured to the axle 16, the brake actuator 42, slack adjuster 46, cam shaft 48 and S-cam bearing (not shown) are mounted to the corresponding mounting bracket 34 and brake mount 40 in a well known manner. The air springs 28 are also affixed to the mounting bracket 34 and the frame rail 14 in a well-known manner. Similarly, the first rolled portion of the spring beams 20 are also mounted to the frame brackets 24 in a traditional manner with a resilient bushing.

Figure 5:
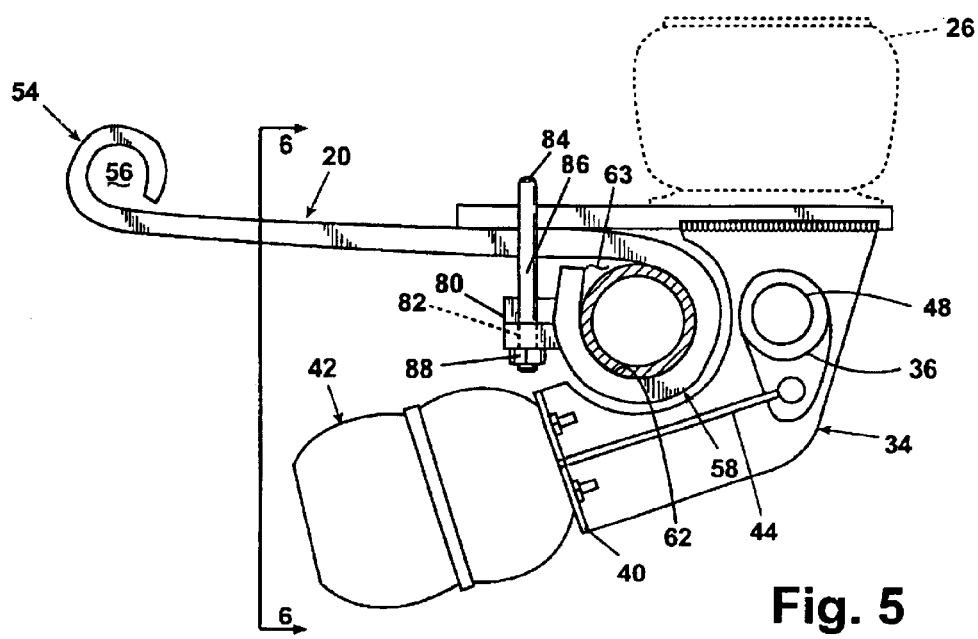
FIG. 5 is a side elevational view of an alternative construction of the compressible axle mount according to the invention.
Figure 6:
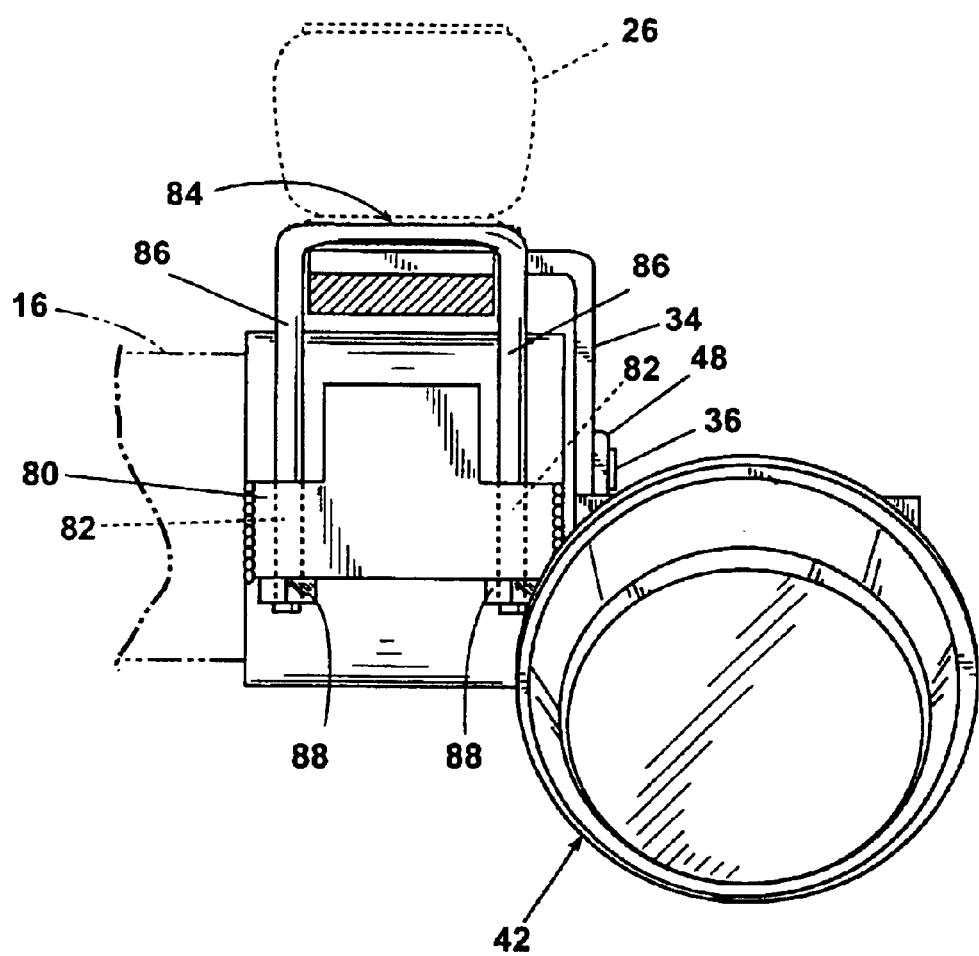
FIG. 6 is a sectional view taken along line 6—6.

FIGS. 5 and 6 illustrate an alternative construction for the compressive mounting of the axle to the spring beam using a U-bolt structure. The alternative beam construction is substantially similar to the previously described construction. Therefore, like numerals will be used to identify like parts and only the differences between the two constructions will be described in detail. The beam 20 has a cylindrical-shaped portion 58 that forms the seat 62, as does the first construction. However, the cylindrical-shaped portion 58 does not terminate in a mounting flange 60, but terminates in a butt end near which is welded a block 80 having spaced openings 82. A U-bolt 84 has threaded ends 86 that are inserted through the spaced openings 82 so that the closed end of the U-bolt 84 bears against the upper surface of the spring beam 20. Nuts 88 are threaded on to the threaded ends 86 to pull the butt end of the cylindrical-shaped portion toward the spring beam central portion and reduce the size of the opening 63 to compressively retain the axle within the axle seat.

The block 80 is preferably welded to the cylindrical-shaped portion while the spring beam is above approximately at 800° F., with the most preferred range being between 1000–1200° F. The spring beam is preferably made from 5160 steel. After the welding is completed, the spring beam can be annealed to relieve the stresses. It is preferred that the block 80 be welded to a portion of the spring beam that is not under stress to ensure that the weld is not compromised.

The U-bolt 84 can overlie a portion of the brake mounting bracket 34 to aid in securing the mounting bracket to the spring beam. Unlike the first embodiment, the brake actuator is carried solely by the brake mounting bracket 34, eliminating the need for any openings in the spring beam as found in the first embodiment.

As with the first embodiment, the diameter of the axle seat is somewhat less than the diameter of the axle 16 when the axle seat 62 is in the unsprung condition, i.e., before the axle seat is opened up to slide the axle into the axle seat 62. The axle 16 can be slipped into the axle seat 62 when the seat is spread with the spacer 70 without any substantial frictional resistance from the axle seat 62. The spacer 70 is removed from the beam 20 after the axle 16 is positioned in the desired location within the axle seat 62. The cylindrical-shaped end portion 58 then closes onto the axle and compresses the axle with adhesive therebetween to secure the axle to the arm 20. The natural resiliency of the spring steel will compress the axle and enhance the adhesive seal between the spring beam 20 and the axle 16.

The benefit of the U-bolt mounting of FIGS. 5 and 6 lies in that fewer openings need be formed in the central portion of the spring beam. Since openings create stress concentrations and the spring beam alternates between compression and tensile loads during normal operation, the stress concentration created by the openings is not preferred. The U-bolt provides for compressively mounting the axle within the axle seat without adding any stress concentrations.

In both embodiments, the beams 20 are preferably made of spring steel and have the flexibility of a leaf spring. The beams 20 are relatively thin compared to the width so that they flex in a vertical direction and are relatively wide so that they are essentially rigid in a lateral or transverse direction to the thickness. In a typical example, the width of the second rolled end 58 of the spring beam can be about 5 inches and the width of the first rolled end can be about 3 inches. The thickness of the spring beam can be about 4 to 5 inches. The tensile strength of a typical spring beam is in the range of 120,000 to 170,000 psi.

While the exact specifications for the spring beam and bushed connector 22 will vary from suspension to suspension, depending on the particular requirements for a given suspension, it is preferred that the bushed connector 22 provides half of the vertical compliance of the roll-induced bending moments and the spring beam provides the other half. With a configuration in which the bushed connector 22 provides a substantial portion of the vertical deflection, the spring beam can be made less robust since it does need to provide for the entire bending moment, resulting in a lighter trailing arm suspension assembly that still performs adequately, while easily compressively mounting the axle assembly. Wrapping the rear portion of the beam 20 around the axle eliminates special axle bracket through which the axle is mounted to the beam. It further eliminates any bushings between the axle brackets and the beam. In addition, since the axle is compressively and adhesively mounted to the beam at the other end of the beam, the brake actuator and S-cam brake assembly can be mounted directly to the beam at the axle mounting or a bracket extending from the beam at the axle mounting and need not be mounted to the axle. This mounting of the brake components directly to the beam at the axle brackets avoids welding the axle to the axle brackets which in turn are mounted to the beams. Welding typically induces stress risers in the axle, which may contribute to the premature failure of the axle. Thus the axle has increased torsional resistance due to the weldless connection to the beam and can be made thinner and lighter than a conventionally welded axle. Thus, with the elimination of various axle attaching parts and bushings and with a lighter axle with at least as high torsional resistance, the suspension is lighter and less expensive, yet performs as well as more conventional trailing arm suspension with welded axle mountings.

Figure 7:
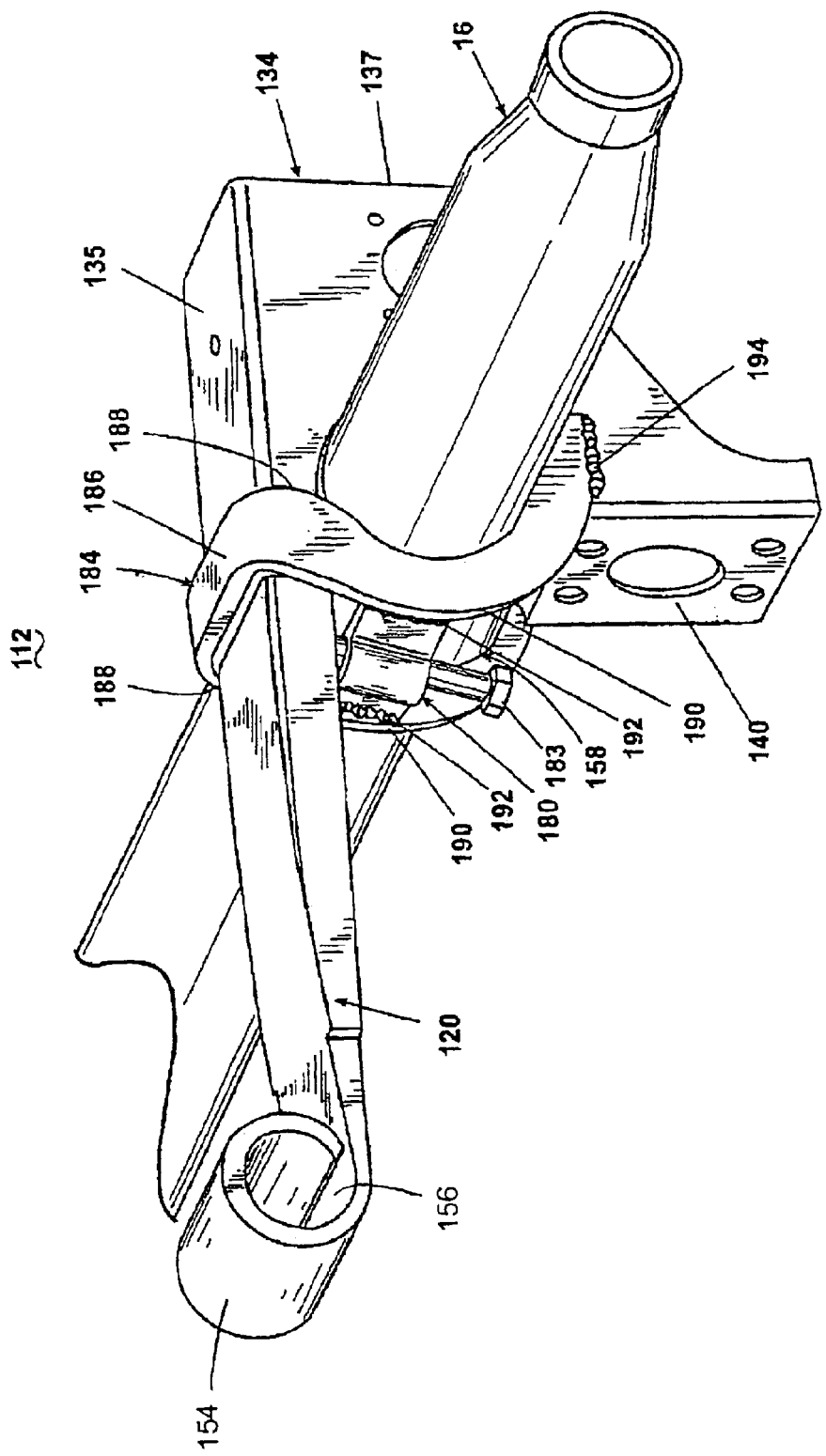
FIG. 7 is a perspective view of yet another alternative construction of the flexible beam with a compressible axle mount and is similar to the alternative construction illustrated in FIG. 5, except for an alternative block and fastener construction.

FIG. 7 illustrates yet another alternative construction of the flexible beam with a compressible axle mount according to the invention. The flexible beam and compressible axle mount illustrated in FIG. 7 is substantially similar to the beam and compressible axle mount illustrated in FIG. 5 except for the block and strap used to mount the mounting bracket to the beam. Therefore, like numerals will be used to identify like parts in the description of the flexible beam with compressible mount of FIG. 7, except that they will be increased by 100.

FIG. 7 illustrates a trailing arm assembly 112 comprising a trailing arm in the form of spring beam 120 comprising a cylindrical-shaped portion 154 at one end and another cylindrical shaped end portion 158 at another end. The cylindrical shaped portion 154 defines a bushing opening 156 that receives a bushed connector, like the bushed connector 22, to rotatably mount the spring beam to a frame bracket. The second cylindrical-shaped end portion 158 defines an axle seat 162, with an opening 163 sized slightly smaller than the diameter of the axle 16 in its relaxed state.

A mounting bracket 134 comprises a top plate 135 and opposing side walls 137 and 138 extending from the top plate 135 to define a U-shaped channel 139 sized to receive the spring beam 120. A brake mount 140 extends laterally from the side wall 137. A gap 141 is formed between the upper edge of the brake mount 140 and the top wall 135. The gap 141 is sized such that the mounting bracket 134 can receive the cylindrical-shaped portion 158 by slidable insertion into the gap.

A block 180 is welded to the cylindrical-shaped portion 158 and has a threaded opening 182, which receives a bolt 183 (FIG. 9) during the assembly of the axle 16 to the beam 120. A U-shaped strap 184 secures the mounting bracket 134 to the beam 120.

The strap 184 comprises a bight portion 186 and opposing legs 188, each of which having a hook-shaped end 190. The bight portion 186 overlies the mounting bracket 134 and the hooks 190 partially encircle the axle 16. Preferably, the hook portion 190 of the legs is welded at 192 to the block 180 and at 194 to the sides of the mounting bracket 134 to secure the mounting bracket 134 to the beam 120 without welding the mounting bracket 134 to the axle 16 or the beam 120.

Referring to FIGS. 8–12, the assembly of the trailing arm assembly of FIG. 7 is described in detail. Many of the assembly steps are similar to those previously described. Therefore, the assembly of the trailing arm assembly 112 will be described only in general terms.

Figure 8:
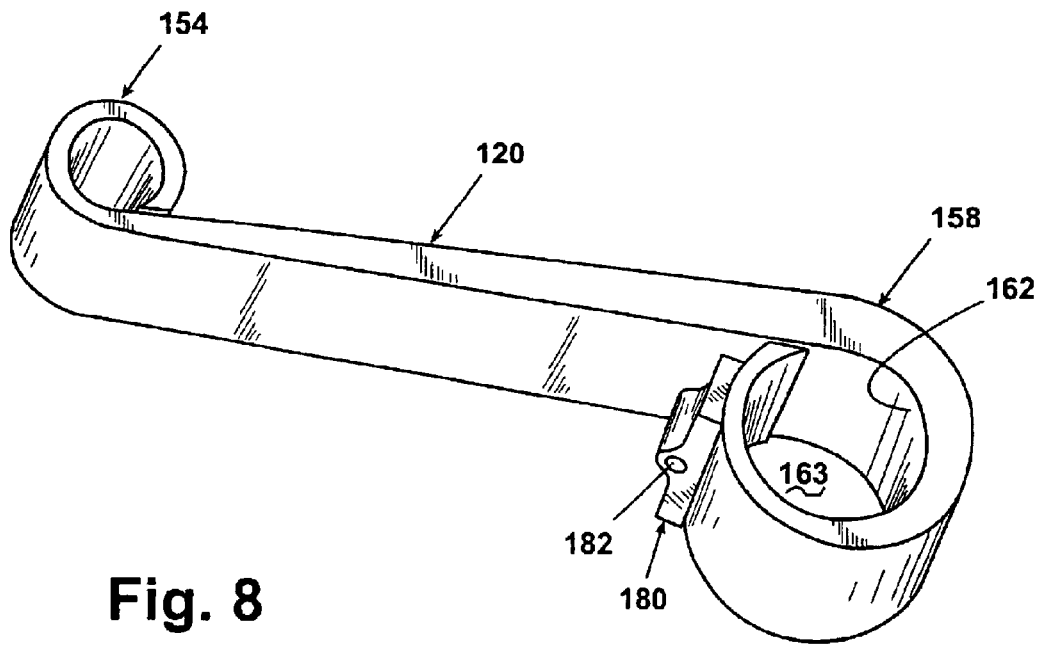
FIG. 8 is a perspective view of a portion of the suspension illustrated in FIG. 7.

Referring to FIG. 8, the spring beam 120 is initially hot formed in the shape as shown in FIG. 8. After the hot forming of the spring beam 120, the block 180 is welded to the spring beam. Under preferred conditions, the spring beam 120 will have a temperature of approximately 1,200° F. The sub-assembly of the spring beam and the block is then heat treated after welding and subsequently shotpeened.

Figure 9:
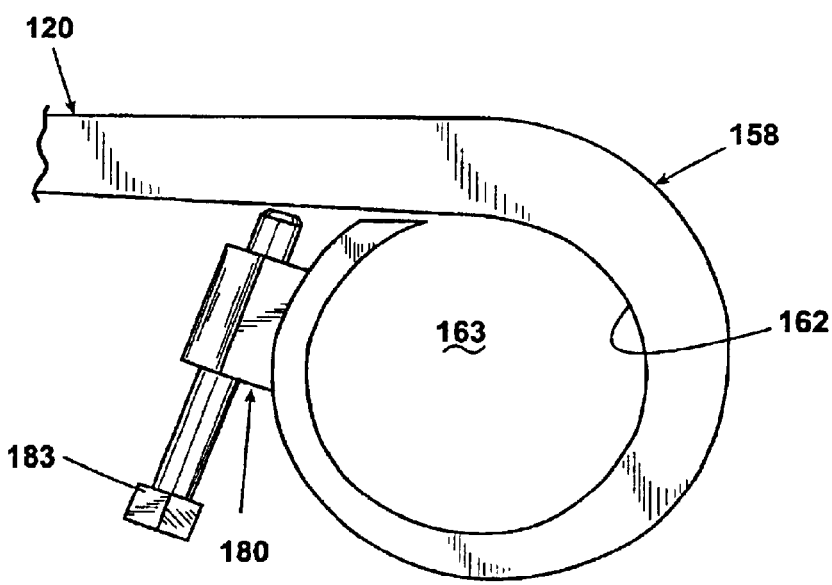
FIG. 9 is a side view of a portion of the suspension illustrated in FIG. 7 illustrating an axle assembly step.

Referring to FIG. 9, once the sub-assembly of the spring beam 120 and the block 180 have cooled, the diameter of the opening 163 of the axle seat 162 is slightly smaller than the diameter of the axle 16. The bolt 183 is threaded into the opening 182 of the mounting block 180 until the end of the bolt contacts the spring beam 120. The bolt is further threaded into the opening 183 until the diameter of the opening 163 is expanded a sufficient amount to receive the axle 16. Typically, the diameter will be expanded approximately 0.1 inches.

Figure 10:
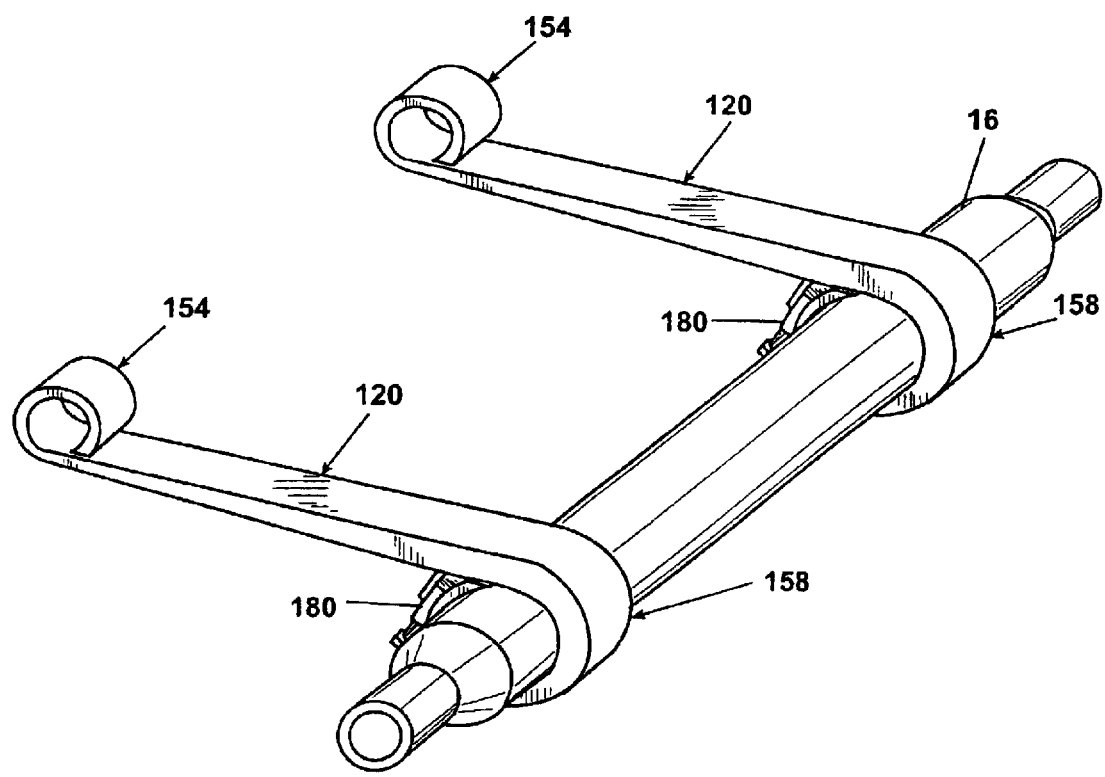
FIG. 10 is a perspective view of a portion of the suspension illustrated in FIG. 7.

Referring to FIG. 10, after the opening 163 of the spring beams 120 are expanded, the axle 16 is inserted through the expanded openings and positioned as desired relative to the spring beams 120. An adhesive is applied to the axle in the same manner as previously described. Once the axle 16 is properly positioned, the bolts 183 are removed and the inherent spring force of the second row portion 158 compressibly retains the axle 16 and the adhesive bonds the axle to the axle seat 162.

Figure 11:
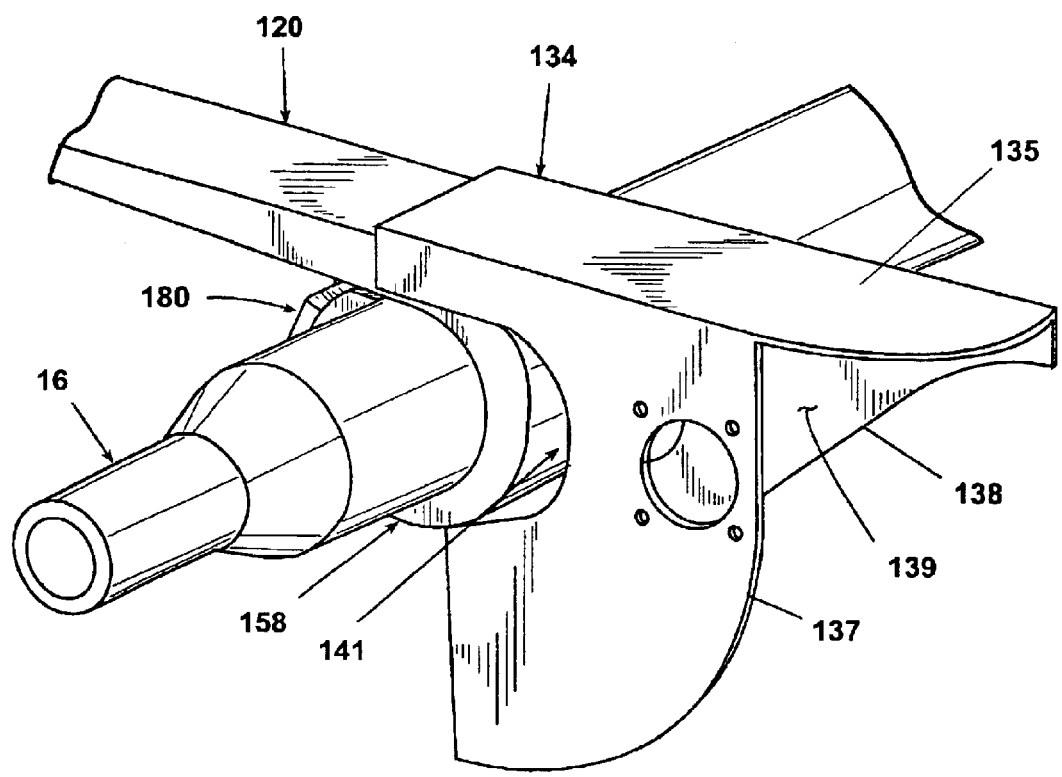
FIG. 11 is a perspective view of a portion of the suspension of FIG. 7 and illustrating the assembly of a mounting bracket to a spring beam.

Referring to FIG. 11, after the assembly of the axle 16 to the spring beams 120, the mounting plate 134 is mounted to each of the spring beams 120 by relatively sliding the mounting plate 134 and the spring beam 120 such that the spring beam 120 extends into the gap 141 and the top plate 135 rests on the upper surface of the spring beam.

Figure 12:
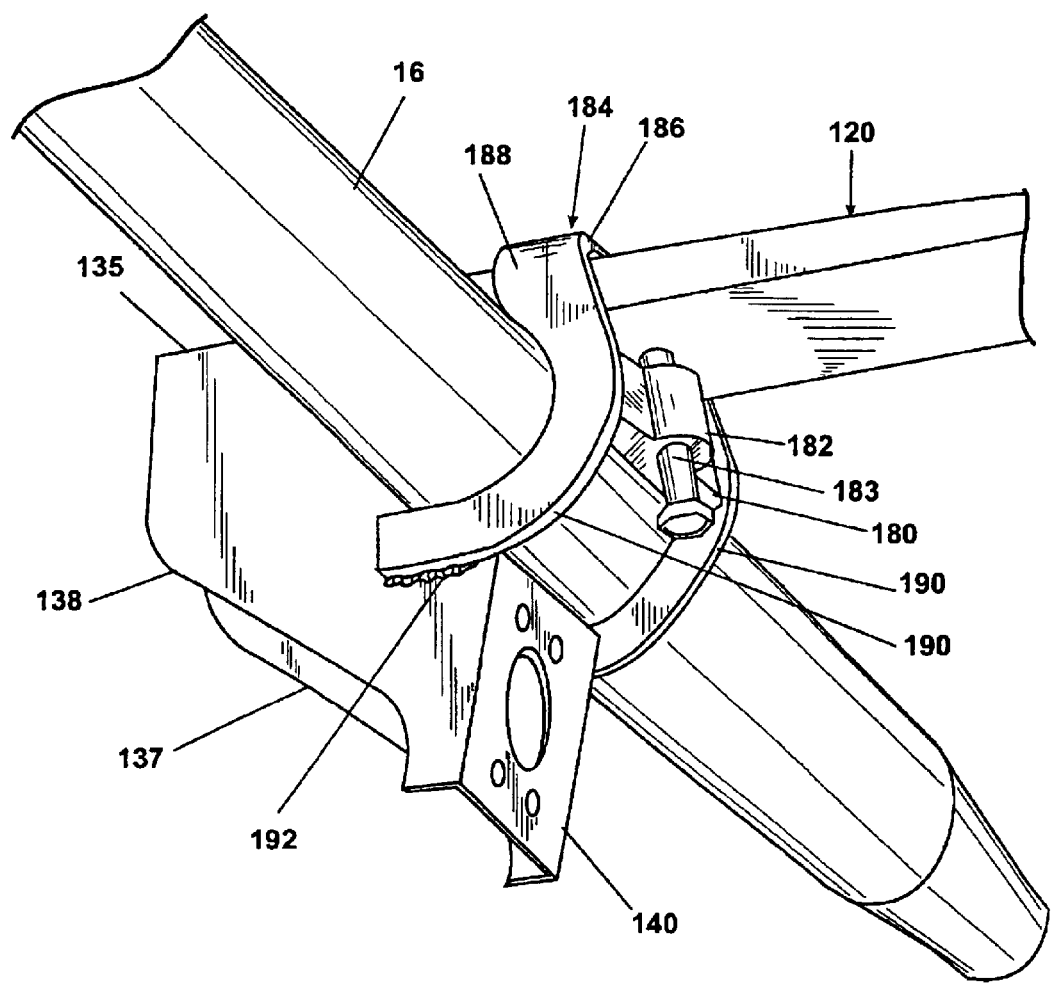
FIG. 12 is a perspective view of the suspension of FIG. 7, illustrating the assembly of a strap to the spring beam.

Referring to FIG. 12, the strap 184 is mounted to the mounting plate 134 such that the bight portion 185 overlies the top wall 135 and the hook portions 190 partially encircle the axle 16. The strap 184 is welded to the mounting block 180 and the side walls 137, 138 of the mounting bracket 134 to fixedly retain the mounting bracket 134 to the spring beam 120, without directly welding the mounting bracket 134 to the axle 16.

Reasonable variation and modification are possible within the scope of the forgoing disclosure without departing from the spirit of the invention which is defined in the appended claims. For example, whereas the spring beam has been described with reference to a beam with unequal widths at the ends, it is within the scope of the invention for the spring beam to have equal widths. In the event that the spring beam has equal widths, the first rolled end at the hanger bracket can be made somewhat thinner than the axle-mounting end.

Also, it is conceivable that a beam made of a composite material could be used in place of the steel beam shown, and additional brackets could be glued to the beam and the axle.

What is claimed is:

1. In a suspension comprising a pair of trailing arm assemblies adapted to mount on a vehicle frame having a pair of spaced frame rails, each trailing arm assembly including:
   a frame bracket adapted to be mounted to one of the frame rails;
   a spring beam defining an elongated central portion and pivotally mounted at a first end of the frame bracket for pivotal movement about a pivot axis;
   a spring mounted to the spring beam a spaced distance from the one end and adapted to mount to the corresponding vehicle frame rail to resist the rotational movement of the spring beam toward the frame; wherein:
   the spring beam includes a looped portion at a second end configured to wrap around an axle and form an axle seat, the looped portion being flexible and defining a tip that is movable relative to the central portion of the spring beam.

2. The suspension according to claim 1 wherein the spring beam has a cylindrical-shaped portion that forms the axle seat.

3. The suspension according to claim 2 wherein the cylindrical-shaped portion defines an axle opening that is adapted to slidably receive the axle.

4. The suspension according to claim 1 and further comprising an axle mounted in the axle seats in each of the trailing arm assemblies and an adhesive layer between the axle and the axle seats bonding the axle to the axle seats.

5. In a suspension comprising a pair of trailing arm assemblies adapted to mount on a vehicle frame having a pair of spaced frame rails, each trailing arm assembly including:
   a frame bracket adapted to be mounted to one of the frame rails;
   a spring beam pivotally mounted at one end to the frame bracket for pivotal movement about a pivot axis and adapted to carry an axle at another end;
   a spring mounted to the spring beam a spaced distance from the one end and adapted to mount to the corresponding vehicle frame rail to resist the rotational movement of the spring beam toward the frame;
   the improvement comprising:
   an axle seat integrally formed in the spring beam for mounting an axle thereto;
   the spring beam has a cylindrical-shaped portion that forms the axle seat;
   the cylindrical-shaped portion defines an axle opening that is adapted to slidably receive the axle; and
   the spring beam has a flange that extends longitudinally from the cylindrical-shaped portion along a central portion of the spring beam for clamping the cylindrical-shaped portion around the axle.

6. The suspension according to claim 5 wherein the central portion of the spring beam and the flange have openings in registry with each other, and further comprising a bolt extending through the openings in the spring beam and the flange for clamping the cylindrical-shaped portion around the axle.

7. The suspension according to claim 5 and further comprising a fastener that overlies a portion of the spring beam and is fixedly secured to the flange to fix the position of the flange relative to the spring beam.

8. The suspension according to claim 7 wherein the flange is a separate block that is fixed to an end portion of the cylindrical-shaped portion.

9. The suspension according to claim 8 wherein the fastener is a U-bolt, and the block has openings that receive portions of the U-bolt.

10. The suspension according to claim 8 wherein the fastener is a strap having a bight portion overlying the portion of the spring beam and hook portions partially encircling the axle.

11. The suspension according to claim 7 and further comprising a mounting bracket that is compressively retained to the spring beam by the fastener.

12. The suspension according to claim 11 wherein the fastener is fixedly secured to the mounting bracket.

13. In a suspension comprising a pair of trailing arm assemblies adapted to mount on a vehicle frame having a pair of spaced frame rails, each trailing arm assembly including:

a frame bracket adapted to be mounted to one of the frame rails;

a spring beam made of spring steel and pivotally mounted at one end to the frame bracket for pivotal movement about a pivot axis and adapted to carry an axle at another end, wherein the spring beam is significantly wider than it is thick;

a spring mounted to the spring beam a spaced distance from the one end and adapted to mount to the corresponding vehicle frame rail to resist the rotational movement of the spring beam toward the frame;

the improvement comprising:

an axle seat integrally formed in the spring beam for mounting an axle thereto;

an axle mounted in the axle seats in each of the trailing arm assemblies and an adhesive layer between the axle and the axle seats bonding the axle to the axle seats, wherein:

the axle seats are sized to substantially encircle the axle and are in tension along an inner surface of the axle seat and compress the axle and evenly distribute a compressive load on the axle across at least two sets of diametrically opposed external surfaces of the axle.

14. The suspension according to claim 13 wherein each of the axle seats defines an axle opening that has a diameter less than a diameter of the axle when the axle is not mounted in the axle seat.

15. The suspension according to claim 14 wherein the spring beam forms a traverse bolt opening for mounting the one end of the spring beam to the frame bracket for pivotal movement about a pivot axis, the spring beam has a longitudinal center line perpendicular to the pivot axis and a longitudinal centerline transverse to the axle seat, and the axle seat longitudinal centerline is located outboard of the pivot axis longitudinal centerline.

16. The suspension according to claim 15 wherein the traverse bolt opening is cylindrically shaped.

17. The suspension according to claim 16 and further comprising a brake actuator rigidly mounted to the spring beam closely adjacent the axle seat.

18. A suspension comprising a pair of trailing arm assemblies adapted to mount on a pair of spaced vehicle frame rails, each trailing arm assembly including:

a frame bracket adapted to be mounted to one of the frame rails;

a spring beam pivotally mounted at one end to the frame bracket for pivotal movement about a pivot axis, the spring beam having an end portion forming an open loop defining an axle seat adapted to carry an axle, the spring beam having a longitudinal centerline transverse to the pivot axis and a longitudinal centerline transverse to the axle seat and wherein: the axle seat longitudinal centerline is located outboard of the pivot axis longitudinal centerline;

a spring mounted to the spring beam a spaced distance from the one end and adapted to mount to the corresponding vehicle frame rail to resist the rotational movement of the spring beam toward the frame.

19. The suspension according to claim 18 wherein the spring beam has a cylindrical-shaped portion that integrally forms the axle seat.

20. The suspension according to claim 18 and further comprising an axle mounted in the axle seat in each of the trailing arm assemblies and an adhesive layer between the axle and the axle seat bonding the axle to the axle seat.

21. The suspension according to claim 20 wherein the axle seat is sized to substantially encircle the axle and is in tension along an inner surface of the axle seat to compress the axle and evenly distribute a compressive load on the axle across at least two sets of diametrically opposed external surfaces of the axle.

22. The suspension according to claim 21 wherein the axle seat is formed by bending a portion of the spring beam to define an axle opening that has a diameter less than a diameter of the axle when the axle is not mounted in the seat.

23. The suspension according to claim 22 and further comprising a brake actuator rigidly mounted to the spring beam closely adjacent the axle seat.

24. The suspension according to claim 23 wherein the spring beam forms a transverse bolt opening for pivotally mounting the spring beam to the frame bracket.

25. The suspension according to claim 24 wherein the traverse bolt opening is cylindrically shaped.

26. In a suspension comprising a pair of trailing arm assemblies adapted to mount on a pair of spaced vehicle frame rails, each trailing arm assembly including:

a frame bracket adapted to be mounted to one of the frame rails;

a spring beam pivotally mounted at one end to the frame bracket for pivotal movement about a pivot axis and having an axle seat spaced from the one end and adapted to carry an axle, the spring beam having a longitudinal centerline transverse to the pivot axis and a longitudinal centerline transverse to the axle seat;

a spring mounted to the spring beam a spaced distance from the one end and adapted to mount to the corresponding vehicle frame rail to resist the rotational movement of the spring beam toward the frame;

the improvement comprising:

the axle seat longitudinal centerline is located outboard of the pivot axis longitudinal centerline;

the spring beam has a cylindrical-shaped portion that integrally forms the axle seat, and wherein:

the cylindrical-shaped portion has a flange extending longitudinally therefrom along a central portion of the spring beam for clamping the cylindrical-shaped portion around the axle.

27. The suspension according to claim 26 wherein the central portion of the spring beam and the flange have openings in registry with each other and further comprising a bolt extending through openings in the spring beam and the flange for clamping the cylindrical-shaped portion around the axle.

28. The suspension according to claim 26 and further comprising a fastener that overlies a portion of the spring beam and is fixedly secured to the flange to fix the position of the flange relative to the spring beam.

29. The suspension according to claim 28 wherein the flange is a separate block that is fixed to an end portion of the cylindrical-shaped portion.

30. The suspension according to claim 26 and further comprising a mounting bracket that is compressively retained to the spring beam by the fastener.

31. The suspension according to claim 30 wherein the fastener is fixedly secured to the mounting bracket.

* * * * *